United States Patent [19]
Shibata et al.

[11] Patent Number: 5,596,421
[45] Date of Patent: Jan. 21, 1997

[54] OPTICAL DISK RECORDER FOR VIDEO SIGNALS AND AN OPTICAL DISK FOR USE THEREIN

[75] Inventors: Hideaki Shibata, Osaka; Masahiro Honjo, Sakai, both of Japan

[73] Assignee: Matsushita Electric Industrial Co., Ltd., Osaka, Japan

[21] Appl. No.: 253,803

[22] Filed: Jun. 3, 1994

[30] Foreign Application Priority Data

Jun. 3, 1993 [JP] Japan ................................. 5-133138
Jun. 25, 1993 [JP] Japan ................................. 5-154770

[51] Int. Cl.⁶ .................................................. H04N 5/85
[52] U.S. Cl. ............................ 386/126; 348/42; 348/44; 348/420; 386/109
[58] Field of Search .............................. 358/335, 342, 358/330, 313, 310; 348/42, 43, 44, 390, 420, 422; 360/33.1, 35.1, 18, 20, 22, 23, 29, 30; H04N 5/76, 5/84, 5/85, 9/79, 9/797

[56] References Cited

U.S. PATENT DOCUMENTS

| | | | |
|---|---|---|---|
| 3,852,520 | 12/1974 | Bruch | 358/334 |
| 4,739,418 | 4/1988 | Iwahara et al. | 348/43 |
| 4,862,292 | 8/1989 | Enari et al. | 348/42 |
| 5,012,351 | 4/1991 | Isono et al. | 348/42 |
| 5,136,391 | 8/1992 | Minami | 358/310 |
| 5,150,208 | 9/1992 | Otaka et al. | 348/384 |
| 5,237,424 | 8/1993 | Nishino et al. | 358/310 |
| 5,257,111 | 10/1993 | Kakuyama | 358/342 |
| 5,282,186 | 1/1994 | Yoshio et al. | 358/342 |

FOREIGN PATENT DOCUMENTS 62-295595  12/1987  Japan .

OTHER PUBLICATIONS

J. Boyce & F. Lane, "Fast Scan Technology For Digital Video Tape Recorders", IEEE Transactions on Consumer Electronics, vol. 39, No. 3, (8–93).

Primary Examiner—Tommy P. Chin
Assistant Examiner—Khoi Truong
Attorney, Agent, or Firm—Ratner & Prestia

[57] ABSTRACT

A video recorder for recording a video signal having one frame period and having a high resolution such as a high definition television signal. The video signal in a frame period is divided into two groups for corresponding to a respective field period of the video signal. The two groups are encoded efficiently and independently of each other. After encoding the respective data as respective variable length data signals, pseudo data is added to either one of the variable length data signals having a smaller amount of variable length data than the other variable length data signal so that the amount of variable length data in the divided signals is substantially equal for a designated period. The encoded data is then recorded on an optical disk by a recording mechanism using two respective channels. When reproducing a video signal having lower resolution, such as is used for a standard television system, the video signal is reproduced by decoding the encoded data for one channel. When reproducing video signal having a higher resolution, such as a high definition television signal, the video signal is reproduced by decoding the encoded data from both channels.

3 Claims, 7 Drawing Sheets

OPTICAL DISK RECORDER FOR VIDEO SIGNALS AND AN OPTICAL DISK FOR USE THEREIN

BACKGROUND OF THE INVENTION

1. Field of the Invention

The present invention relates to an optical disk recorder, an optical disk player, and a combined apparatus of an optical disk recorder and player, which record or reproduce a video signal by coding and decoding in a highly efficient manner and to an optical disk recorded by the optical disk recorder.

2. Description of the Prior Art

FIG. 1 is a block diagram of a prior art recorder and FIG. 2 is a block diagram of a prior art player. In FIG. 1, a block dividing circuit 102 divides video data into very small blocks composed of a plurality of picture elements which are changed in order using a memory. An orthogonal transformer 103 transforms the data orthogonally, for example, by Discrete Cosine Transformation (DCT) for every block. A quantizer 104 quantizes each coefficient after orthogonal transformation. Also provided is a variable length encoder 105 using Huffman encoding. An error detection and correction code adding circuit 112 adds parity for detecting and correcting errors to the data after encoding. A modulator 113 converts the encoded data into a data row, which is matched to the optical disk.

In FIG. 2, a reproducing head 117 reproduces the signal recorded in the optical disk 116. An error detection, correction, and compensation circuit 120 removes parity which is added to the digital data after demodulation at the error detection and correction code adding circuit 112. The compensation circuit 120 also corrects and compensates the data if there is an error. A block synthesizing circuit 124 synthesizes the decoded data for every block into video data before the data is divided by block dividing circuit 102.

In the recorder side shown in FIG. 1, a video signal applied to an input terminal 128 after being sampled and quantized, is divided into very small blocks composed of a plurality of picture elements of, for example, 64 picture elements of 8 horizontal picture elements by 8 vertical picture elements, at the block dividing circuit 102. The orthogonal transformer 103 orthogonally transforms every divided block. As a result, transformation coefficients corresponding to the number of picture elements in the block are produced. The transformation coefficients are quantized at quantizer 104. The quantized transformation coefficients are encoded as a variable length code in variable length encoder 105.

Parity for error correction is added to the output of the variable length encoder 105 at the error detection and correction code adding circuit 112. Then, the output of the error detection and correction code adding circuit 112 is digitally modulated, such as 8 to 14 modulation, at modulator 113. The output of modulator 113 is amplified at the recording amplifier 114 and the output of the recording amplifier 114 is recorded in optical disk 116 through recording head 115.

In the player side shown in FIG. 2, the digital data read from the optical disk 116 through the reproducing head 117 is digitally demodulated at the demodulator 119 after being amplified at the reproducing amplifier 118. The error detection, correction and compensation circuit 120 detects parity for error correction from the digital data after demodulation, removes it, and corrects and compensates errors in the digital data by calculation when an error is detected. For example, this is accomplished by examining the remainder of a demodulated code which has been divided by a generated polynomial expression. If the remainder is not zero, an error exists and the bit position is calculated using the remainder. Then, the bit is reversed. The output of the error detection, correction and compensation circuit 120 is decoded to produce a code with variable length at the variable length decoder 121. Then, the variable length code is inversely quantized at reverse quantizer 122. The digital data after inverse quantization is then provided to the reverse orthogonal transformer 123 to perform a reverse-orthogonal transformation for every block. Digital data decoded for each block is synthesized at the block synthesizing circuit 124 and supplied from output terminal 129 as a quantized decoded video signal.

In the above-mentioned configuration, however, where an encoded high definition television signal is recorded in the optical disk, only the decoded high definition television signal is obtained at the player side. That is, no standard system television signal is obtained. Therefore, the apparatus is not compatible with a standard television system. As a result, separate circuits are required for a high definition television signal and for a standard system television signal. Furthermore, when a digital video signal encoded and recorded on one optical disk separates video signals for both the right eye and left eye, only a united decoded video signal for the right eye and the left eye are obtained at the player side. That is, neither of the decoded video signals for the right eye and the left eye is obtained.

SUMMARY OF THE INVENTION

The present invention relates to an optical disk recorder and/or player and an optical disk which may be used to encode a high definition television signal with high efficiency on an optical disk. In addition, the present invention also relates to decoding the high definition television signal so that the signal may be outputted to a standard television receiver. The present invention also relates to an encoding circuit and an decoding circuit for a standard television signal which can be used for encoding and decoding a high definition television signal.

The present invention further relates to an optical disk recorder and/or player and an optical disk for encoding a video signal composed of a video data for a individual's right eye and left eye with high efficiency on an optical disk. The present invention also relates to decoding the video signal for containing video data for both eyes or for decoding the video signal for either eye at the player side.

An exemplary embodiment of the optical disk recorder and/or player according to the present invention includes a dividing circuit for dividing video data in a frame period of a high definition video signal into two data groups. Also included is an encoding circuit for independently encoding each divided data group in a highly efficient manner and for recording the encoded data in an optical disk. Further included is a decoding circuit for reproducing a video signal having low definition by decoding one of two data groups retrieved from the recorded optical disk and another video signal having high definition by decoding both data groups.

An optical disk recorder and/or player relating to the present invention may display a picture on a standard television receiver or on a high definition television when a high definition television signal has been encoded and recorded on an optical disk. Furthermore, an encoding circuit and a decoding circuit for a standard system television signal can be used for encoding and decoding a high definition television signal.

An optical disk recorder and/or player of the present invention can reproduce a video signal containing data for both eyes and a video signal containing data for either eye at the player side, when the video signal is composed of video data for a person's right eye and left eye, which has been efficiently encoded, recorded in an optical disk, and reproduced from the recorded optical disk.

DETAILED DESCRIPTION OF THE INVENTION (First exemplary embodiment)

Figure 3:
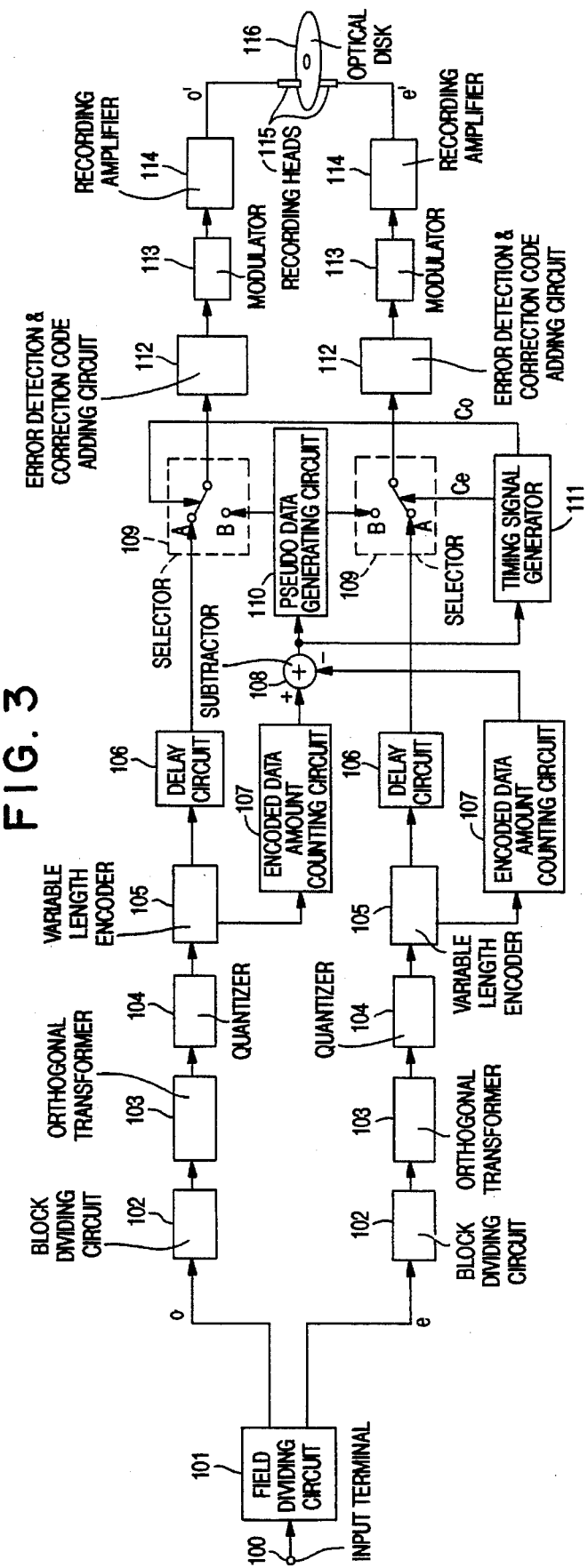
FIG. 3 is a block diagram of an optical disk recorder in accordance with an exemplary embodiment of the present invention.
Figure 4:
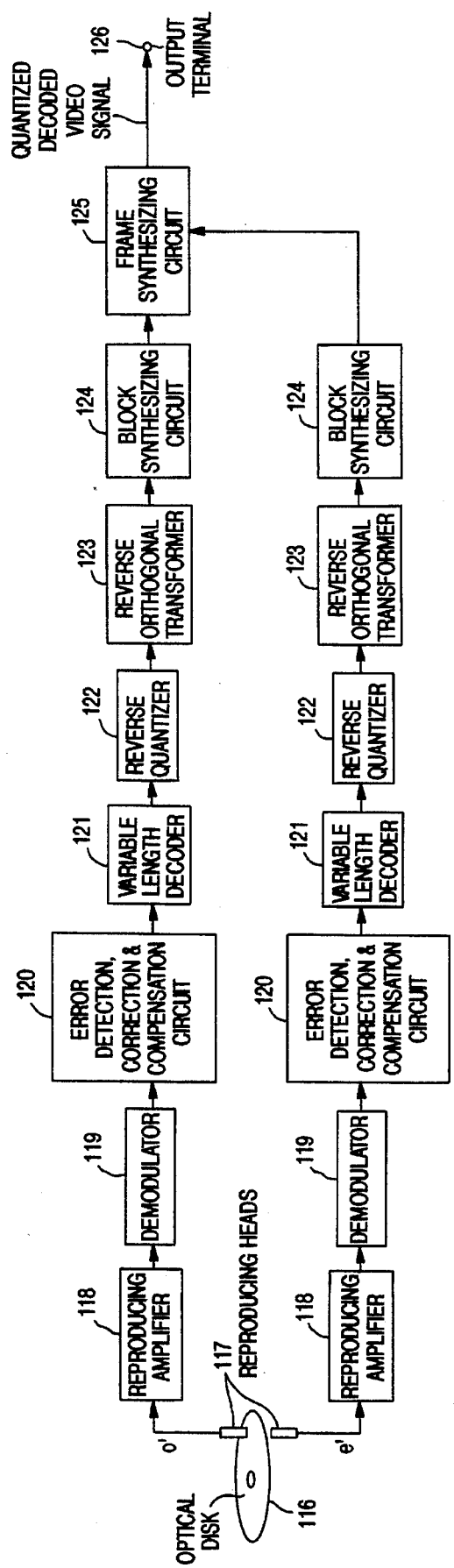
FIG. 4 is a block diagram of an optical disk player for a high definition television signal in accordance with an exemplary embodiment of the present invention.
Figure 5:
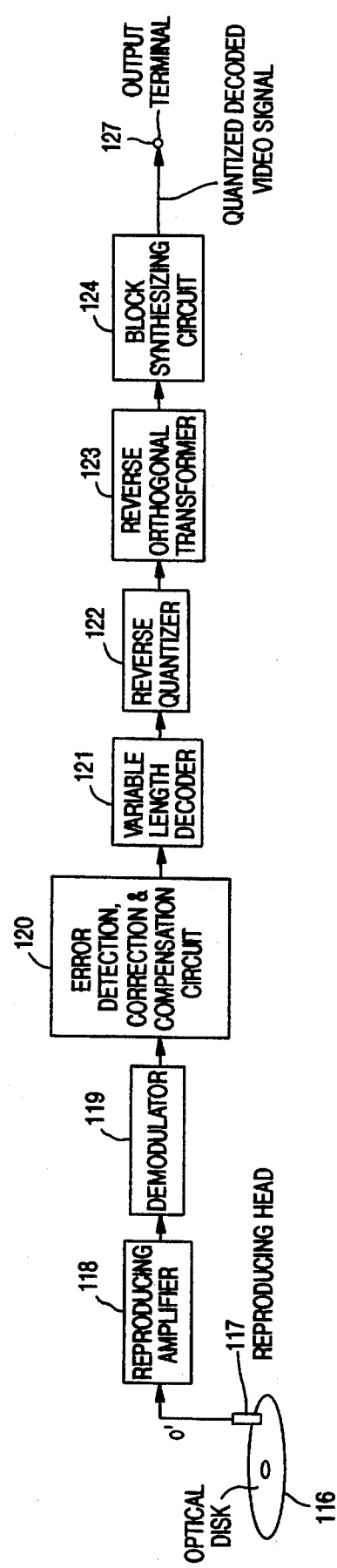
FIG. 5 is a block diagram of an optical disk player for a standard system television signal in accordance with an exemplary embodiment of the present invention.

FIG. 3 is a block diagram of an optical disk recorder in accordance with an exemplary embodiment of the present invention. FIG. 4 is a block diagram of an exemplary optical disk player for a high definition television signal in accordance with the present invention for reproducing a video signal having a high resolution. FIG. 5 is a block diagram of an exemplary optical disk player for a standard system television signal in accordance with the present invention for reproducing a video signal having a low resolution. In the exemplary embodiment, video data of one frame period of the high definition television signal is divided into two field periods.

Figure 1:
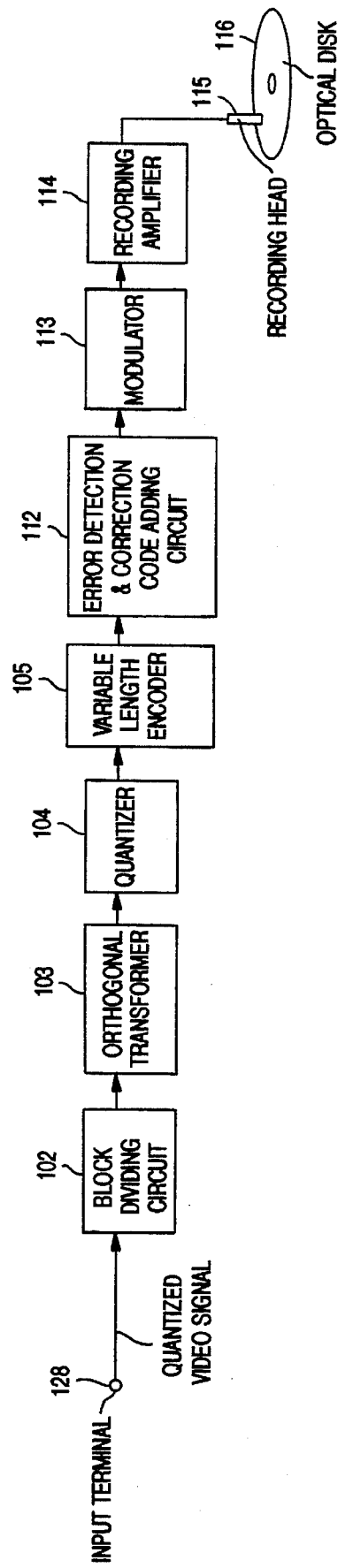
FIG. 1 is a block diagram of an optical disk recorder in accordance with the prior art.
Figure 2:
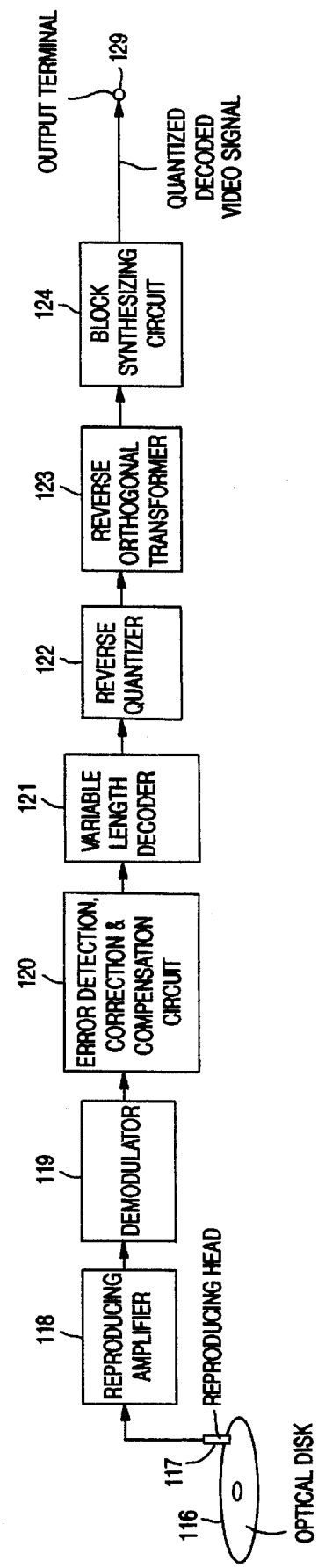
FIG. 2 is a block diagram of an optical disk player in accordance with the prior art.

In FIGS. 3, 4 and 5, blocks having the same numbers as those shown in FIGS. 1 and 2 function similarly to the blocks in the prior art.

A field dividing circuit 101 divides a video data in one frame period of a high definition television signal into two alternating field groups, an odd field data group composed of odd number lines and an even field data group composed of even number lines. The field dividing circuit 101 includes a field memory and a selector. A delay circuit 106 delays the data by a period of time necessary for data processing at an encoded amount counting circuit 107 and subtractor 108. The encoded amount counting circuit 107 counts, for every designated period, counts the amount of encoded digital data encoded to a variable length.

A selector 109 switches between the output of a pseudo data generating circuit 110 and the output of the delay circuit 106. The pseudo data generating circuit 110 generates data which is not normal encoded data, for example data having a zero value. A timing signal generating circuit 111 generates a control signal for selector 109. The timing signal generating circuit 111, for example, includes a field memory and a selector.

A high definition television signal is sampled and quantized, for example, to produce 960 by 960 picture elements during one frame period, and is provided to input terminal 100. The video data is then divided into an odd field video data o composed of odd number lines and an even field video data e composed of even number lines at the field dividing circuit 101. Then, the two divided video data groups, both of which are composed of 960 picture elements in the horizontal direction and 480 picture elements in the vertical direction, are provided to a respective block dividing circuit 102. Each of the video data groups is processed at a respective block dividing circuit 102, orthogonal transformer 103, quantizer 104, and variable length encoder 105. The variable length data output from the variable length encoded 105 is then provided to delay circuit 106 and encoded data amount counting circuit 107. Since the encoded data for the odd field video data and the even field video data have a variable length, there is a possibility that the amount of data for the even and odd field video data may be different. As a result, the physical lengths for the field data recorded in respective regions of an optical disk may be different.

Figure 6:
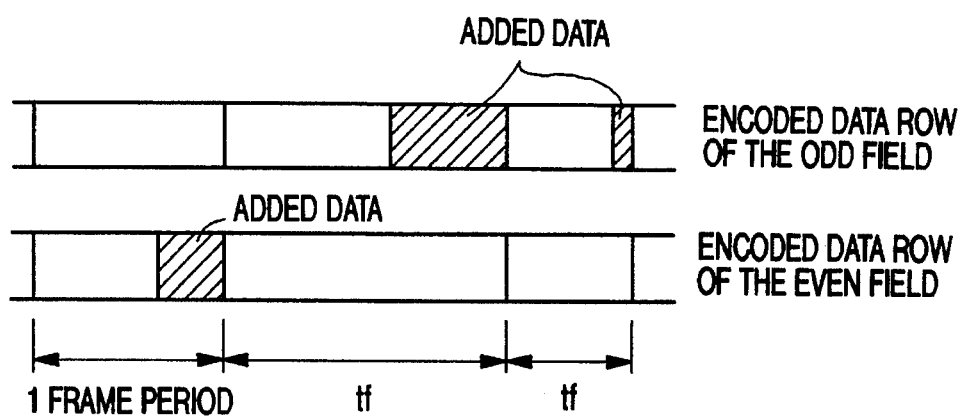
FIG. 6 illustrates that the coded data lengths of an odd field and an even field which are variable length may be made to coincide as a unit of one frame period in an optical disk recorder or player in accordance with an exemplary embodiment of the present invention.

The amount of encoded data for the odd field and the even field generated during a designated period, for example, one frame period tf of the video signal, is compared to determine an amount of pseudo data to be added to account for the difference in the amount of encoded data between the even and odd fields. The added data is shown in the hatched area in FIG. 6 which was added to the encoded data having a smaller amount of encoded data. The total data amount of encoded data is made substantially the same for recording on the optical disk. The encoded data amount counting circuits 107 count the amount of the respective encoded data for the odd field and the even field. The counted data from each encoded data amount counting circuits 107 are subtracted from each other at subtractor 108. The subtracted data count is provided to pseudo data generating circuit 110 and to timing signal generating circuit 111. Delay circuit 106 delays the encoded data by a period of time necessary for processing by the encoded data amount counting circuit 107 and the subtractor 108. The output of the delay circuit 106 is applied to respective terminals A of selectors 109.

The pseudo data generating circuit 110 generates pseudo data corresponding to the absolute value of the output of subtractor 108. Then the pseudo data is applied to terminals B of selectors 109. The timing signal generating circuit 111 generates a selector controlling signal Co for the odd field and a selector controlling signal Ce for the even field according to whether the output of subtractor 108 is positive or negative and the absolute value of the output from subtractor 108. Selectors 109 switch between the output of the delay circuit 106 and the output of the pseudo data generating circuit 110 according to the respective control signals. The output of selectors 109 are provided to respective error detection and correction code adding circuits 112. The data is processed at error detection and correction code adding circuits 112, modulators 113, and recording amplifiers 114 at the recorder side in a similar manner to the process in the prior art. The encoded data for an odd field o' is recorded on the obverse side of the optical disk 116 and the encoded data for an even field e' is recorded on the reverse of the optical disk 116, using two recording heads 115.

At the player side, a high definition television signal is reproduced according to the block diagram shown in FIG. 4. Output terminal 126 supplies a reproduced high definition television signal, that is, a quantized decoded signal. FIG. 4 further includes frame synthesizing circuits 125 which change the order of the decoded data for every field in a time base of the decoded data during one frame period of the high definition television signal. The encoded data for the odd field o' is read from the obverse of the optical disk 116 and the encoded data for the even field e' is read from the reverse of the optical disk 116, using two reproducing heads 117. The respective data is synthesized at block synthesizing circuits 124 after being processed at reproducing amplifiers 118, demodulators 119, error detections, correction and compensation circuits 120, variable length decoders 121, reverse quantizers 122, and reverse orthogonal transformers 123. The block synthesizing circuits 124 provides the decoded data for the odd field o" and the decoded data for the even field e" to the frame synthesizing circuit 125. The frame synthesizing circuit 125 changes the order of the decoded data for the odd field o" and the decoded data for the even field e", to an order of o1", e1", o2", e2", o3", e3", o4", . . . on the time base as shown in line (a) in FIG. 7. The output of frame synthesizing circuit 125 is supplied from output terminal 126 as a high definition television signal.

Because pseudo data was added during recording to make the even and odd field video data equal, the pseudo data needs to be removed. This is accomplished by sequentially decoding the encoded data at the variable length decoder 121 and stopping the decoding process when the decoded data for the designated number of picture elements is obtained. The decoding process is restarred at the beginning of the encoded data of the next frame. Pseudo data is not used in the table for the variable length codes for executing variable length coding. Accordingly, if the coded data input into the variable length decoder 121 is pseudo data, the variable length decoder stops until a variable length code is received. In addition, because the coded data is decoded for every picture element in the variable length decoder, the number of picture elements for one frame period is known. Thus, the end of the decoding process can be determined by comparing the accumulated number of picture elements and the previously known number of picture elements.

Figure 7:
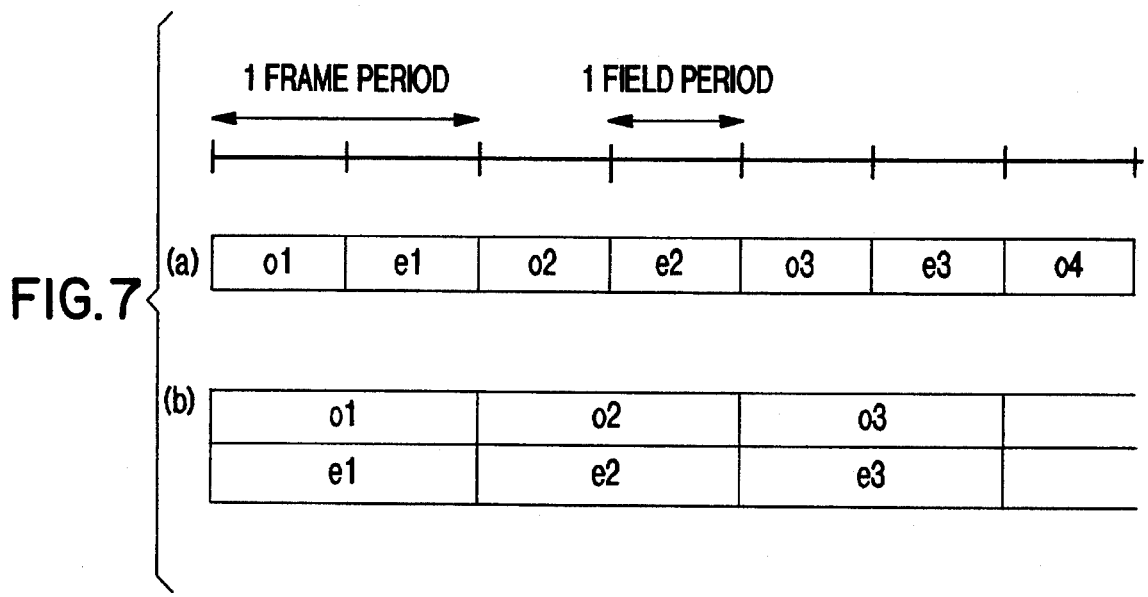
FIG. 7 typically illustrates an exemplary video signal outputted from an output terminal as time series in an optical disk recorder or player in accordance with an exemplary embodiment of the present invention.

When reproducing in a standard system television receiver, the coded data o' or e' is sequentially read from either the obverse and the reverse sides of the optical disk 116 using reproducing head 117 in the block diagram shown in FIG. 5. Reading from the obverse side to obtain coded data o' is only shown for simplicity of explanation. The block synthesizing circuit 124 provides either decoded data, the decoded data o" or the decoded data e", during one frame period of a standard system television signal. Consequently, either decoded signal, o1", o2", o3", . . . or e1", e2", e3, . . . , is supplied from an terminal 127, as shown in FIG. 7(*b*).

In the exemplary embodiment, as explained above, a high definition television signal is recorded by dividing the video data in one frame period of a high definition television signal into two fields for every frame period, encoding the video data for each field efficiently and independently of each other, and recording the encoded data in the optical disk. During playback, for a standard system television signal, the recorded video data is reproduced by decoding the encoded data of either field. During playback for a high definition television signal, video data is reproduced by decoding the encoded data of both fields.

Encoding and decoding of a high definition television signal can be realized by using two encoder and decoder circuits for a standard system television signal.

Although in the exemplary embodiment encoded data for every field is shown to be recorded in two channels, on the obverse and the reverse sides of the optical disk, after being divided from one frame into two for every field by the dividing unit, the dividing unit can be adjusted to perform other dividing methods. For example, the dividing unit may divide the video signal by subsampling.

In addition, various kinds of recording regions are devised for recording the divided coded data as shown, for example, in FIG. 8(*1*)–(*c*).

Figure 8A:
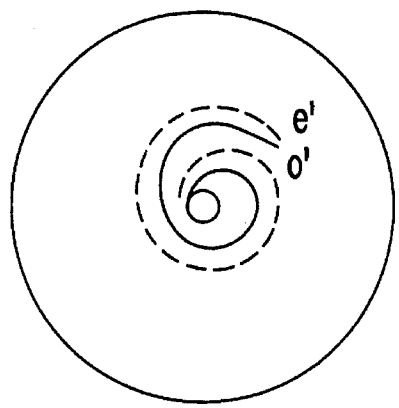
FIG. 8(a) shows, for example, how coded data o' of an odd field, shown as a solid line, and the coded data e' of an even field, shown as broken lines, are recorded on two parallel spiral tracks.

FIG. 8(A) illustrates an example of recording the encoded data o' of the odd field, shown by a solid line, and the encoded data e' of the even field, shown by a broken line, on two parallel spiral tracks on the optical disk.

FIG. 8(*b*) illustrates an example of recording in which the optical disk area is divided into two sections by a boundary defined by a circle with a designated radius. The encoded data of the odd field is recorded in the region inside the boundary, and the coded data of the even field is recorded in the region outside of the boundary on the optical disk.

FIG. 8(*c*) illustrates an example of recording in which the optical disk area is divided into twelve equal sections by six straight lines passing through the center of the disk. The encoded data o' of the odd field and the encoded data e' of the even field are alternately recorded in each section in the peripheral direction. The straight lines may be curves or partially curved. In this case, the recording mechanism or reproducing mechanism can be realized by a time sharing process in one channel and as a result, the apparatus scale may be made reduced.

Second Exemplary Embodiment

In accordance with another exemplary embodiment of the present invention, video data which is multiplexed for every field period, for example, the odd field is a video signal having video data for a person's right eye and the even field is a video signal having video data for a person's left eye, is sampled, quantized and provided to input terminal 100, shown in FIG. 3. The inputted video data is divided into two data blocks at the field dividing circuit 101, and provided to the respective block dividing circuits 102. The function of the remaining blocks shown in FIG. 3 on the recorder side is similar to that of the first exemplary embodiment, and therefore further explanation is omitted.

When the video signals for both right and left eyes are reproduced, an apparatus according to the block diagram as shown in FIG. 4 may be used. The frame synthesizing circuit 125 alternately outputs the decoded signal o" for having right eye video and the decoded signal e" for left eye video data for every field period of the video signal, as shown in FIG. 7(a).

Where a video signal having video data for either eye is reproduced, the apparatus as shown in the block diagram in FIG. 5 may be used. The block synthesizing circuit 124 outputs the decoded data o" for the right eye or the decoded data e" for the left eye during one frame period of the video signal. Consequently, either decoded signal, o1", o2", o3", . . . or e1", e2", e3", . . . as shown in FIG. 7(b) provided from the output terminal 127.

As explained above, where video data is to be recorded as described above in the second exemplary embodiment, video signals having video data for both right and left eyes are encoded efficiently and independently of each other and recorded on an optical disk. During playback of the video signals, video data for either eye may be reproduced by decoding the encoded data for either eye for a standard television signal system. Also during playback, the video signals having video data for both eyes may be reproduced by decoding the encoded data for both eyes for a high definition television.

Figure 8B:
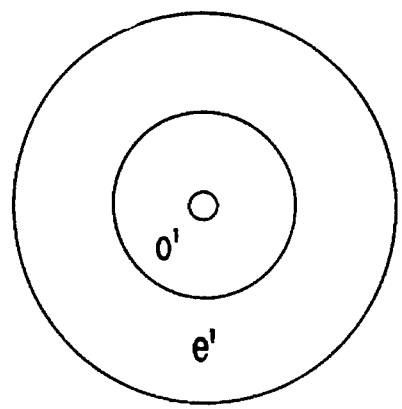
FIG. 8(b) shows an exemplary optical disk area which is divided into two sections by a boundary of a circle with a designated radius where coded data of the odd field is recorded in the inside region of the boundary, and coded data of the even field is recorded in the outside region of the boundary.
Figure 8C:
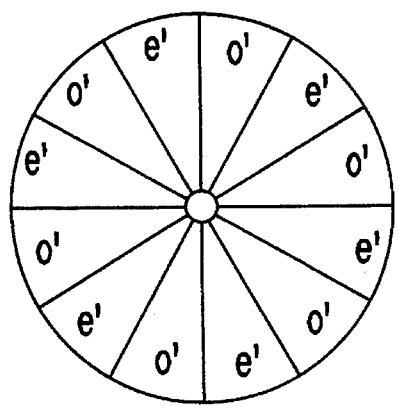
FIG. 8(c) an exemplary an optical disk area which is divided into twelve equal sections by six straight lines passing through the center of the disk where the coded data o' of the odd field and coded data e' of the even field are alternately recorded in each section in the peripheral direction.

Also in the second exemplary embodiment, the video signals having for right eye and for the left eye video data may be recorded in different formats as shown in FIGS. 8(a)-(c) and similar to the first exemplary embodiment.

Although the phrases, "a signal for the right eye" and "a signal for the left eye," are used above, for recording and reproducing, the second exemplary embodiment is also applicable for recording and reproducing other signals having correlating information such as stereoscopic vision and for signals having independent information from each other.

The invention may be embodied in other specific form without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed:

1. An optical recorder for recording an input video signal having video data in at least one frame period, said input video signal having a first resolution, said optical recorder comprising:

dividing means for dividing the video data contained in one frame period of the input video signal into two data groups;

means for independently encoding each of said two data groups to produce a first video signal and a second video signal respectively, each of said first video signal and said second video signal having a second resolution, said second resolution is lower than said first resolution, said means for recording said first video signal and said second video signal on an optical disk in a first channel and a second channel respectively;

counting means tier counting the amount of variable length data in the first video signal and the second video signal for a designated period of time; and means tier adding pseudo data to the variable length data of one of the first video signal and the second video signal which has a smaller amount of the variable length data so that a substantially equal amount of variable length data is in the first video signal and the second video signal.

2. An optical disk in a optical recorder for recording an input video signal having video data in at least one frame period, said optical recorder comprising:

dividing means for dividing the video data contained in one frame period of the input video signal into two field periods containing a first video signal and a second video signal;

means for independently encoding each of said first video signal and said second video signal as first and second variable length data signals;

counting means for counting the amount of variable length data in said first and second variable length data signals during a designated period of time;means for adding pseudo data to the variable length data of one of said first and second variable length data signals which has a smaller amount of the variable length data so that said first and second variable length data signals have a substantially equal amount of said variable length data; and means for recording said first and second variable length data signals including said pseudo data on the optical disk in a first channel and a second channel.

3. An optical disk in a optical recorder for recording a first video signal having multiplexed right eye video data and left video eye data in at least one frame period, said optical recorder comprising:

dividing means for dividing the video data contained in one frame period of the first video signal into two field periods containing the right eye video data and the left eye video data to produce a second video signal and a third video signal respectively means for independently encoding each of said second video signal and said third video signal as first and second variable length data signals respectively;

counting means for counting the amount of variable length data in said first and second variable length data signals during a designated period of time;

means for adding pseudo data to the variable length data of one of said first and second variable length data signals which has a smaller amount of the variable length data so that the amount of the variable length data in said first and second variable length data signals is substantially equal; and means for recording said first and second variable length data signals including said pseudo data on said optical disk in a first channel and a second channel respectively using a recording mechanism.

* * * * *

UNITED STATES PATENT AND TRADE MARK OFFICE
CERTIFICATE OF CORRECTION

PATENT NO. : 5,596,421
DATED : January 21, 1997
INVENTOR(S) : Shibata et al.

It is certified that error appears in the above-identified patent and that said Letters Patent is hereby corrected as shown below:

Column 8, line 4, delete "tier" and insert therefor --for--.

Column 8, line 7, delete "tier" and insert therefor --for--.

Signed and Sealed this

Seventeenth Day of June, 1997

Attest:

BRUCE LEHMAN

Attesting Officer

Commissioner of Patents and Trademarks